US008934160B2

(12) United States Patent　(10) Patent No.: US 8,934,160 B2
Sun　(45) Date of Patent: Jan. 13, 2015

(54) OPTICAL HEAD-MOUNTED DISPLAY WITH MECHANICAL ONE-DIMENSIONAL SCANNER

(71) Applicant: National Central University, Taoyuan County (TW)

(72) Inventor: Ching-Cherng Sun, Taiyuan County (TW)

(73) Assignee: National Central University, Taoyuan County (TW)

( * ) Notice: Subject to any disclaimer, the term of this patent is extended or adjusted under 35 U.S.C. 154(b) by 0 days.

(21) Appl. No.: 14/257,034

(22) Filed: Apr. 21, 2014

(65) Prior Publication Data

US 2014/0226193 A1　Aug. 14, 2014

Related U.S. Application Data

(63) Continuation-in-part of application No. 13/280,560, filed on Oct. 25, 2011, now abandoned.

(51) Int. Cl.
　　*G03H 1/00*　　(2006.01)
　　*G02B 5/32*　　(2006.01)
　　*G02B 27/01*　　(2006.01)
　　*G02B 26/10*　　(2006.01)

(52) U.S. Cl.
　　CPC .............. *G02B 5/32* (2013.01); *G02B 27/0172* (2013.01); *G02B 26/10* (2013.01)
　　USPC ............................................ 359/13; 359/630

(58) Field of Classification Search
　　None
　　See application file for complete search history.

(56) References Cited

U.S. PATENT DOCUMENTS 7,199,934 B2 *　4/2007　Yamasaki ..................... 359/630
2010/0149073 A1　6/2010　Chaum et al.

* cited by examiner

*Primary Examiner* — Jennifer L. Doak
(74) *Attorney, Agent, or Firm* — Rosenberg, Klein & Lee

(57) ABSTRACT

An optical head-mounted display includes an eyeglass frame, a holographic optical element supported by the eyeglass frame to be confronted by an eye of a wearer, and a projector mounted on the eyeglass frame to project image information on the holographic optical element. The projector includes a LED light source, a beam-splitting polarizer, a spatial light modulator, a lens set and a mechanical one-dimensional scanner. The mechanical one-dimensional scanner reflects the transformed light beam from the lens set onto the holographic optical element in one dimension at a time. When the reflective sheet is rotated at a range of angle in a brief moment of time, the holographic optical element receives from the rotating reflective sheet an array of one-dimensional modulated light beams and reflects the latter to form a two-dimensional image in the eye because of persistence of vision.

8 Claims, 7 Drawing Sheets

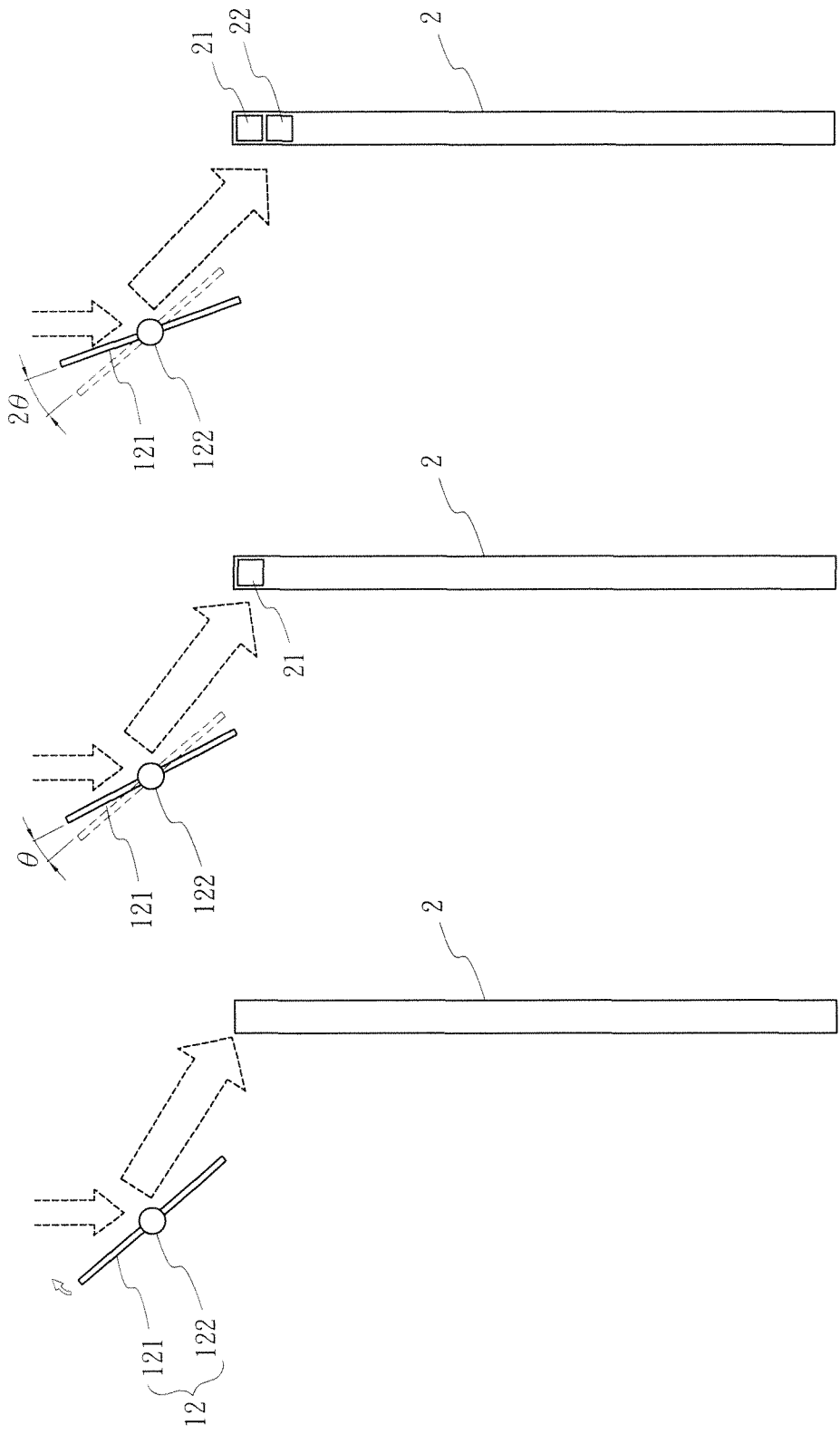

OPTICAL HEAD-MOUNTED DISPLAY WITH MECHANICAL ONE-DIMENSIONAL SCANNER

CROSS-REFERENCE TO RELATED APPLICATION

This is a continuation-in-part of co-pending application Ser. No. 13/280,560, filed Oct. 25, 2011, currently pending.

BACKGROUND OF THE INVENTION

1. Field of the Invention

The present invention relates to an image display device, more particularly to an optical head-mounted display for projecting image onto pupils of human eyes.

2. Description of Related Art

Nowadays, LCD panels are widely used to the portable devices, such as smart phones, tablet computers, handheld video game devices . . . etc. Thus, people can enjoy different kinds of entertainments from these portable devices in the leisure time. However, to watch the video or movie on these portable devices for several hours often causes people to feel uncomfortable, especially on their necks and hands.

In order to improve the shortcoming mentioned above, a manufacturer designs one image display device which is worn on a user's head. The image display device uses a mapping device to show the image in front of the user's eyes. Thus, the user can comfortably enjoy the video or movie via the image display device.

Unfortunately, the image display device still has one shortcoming. The users cannot be aware of the traffic around themselves when they wear the image display to go on the road because the image mapped from the image display device occupies the user's eyes and the view around the user cannot be transparent into the user's eyes. Although some manufacturers try to use beam splitters or light guide devices to overcome this shortcoming, the image becomes ambiguous because of the energy loss of photons.

The present invention has arisen to mitigate and/or obviate the disadvantages of the conventional.

SUMMARY OF THE INVENTION

The main objective of the present invention is to provide an improved optical head-mounted display with less energy loss of photons.

To achieve the objective, the optical head-mounted display includes an eyeglass frame, a holographic optical element (HOE) supported by the eyeglass frame to be confronted by an eye of a wearer, and a projector mounted on the eyeglass frame to project image information on the holographic optical element. The projector includes a LED light source, a beam-splitting polarizer, a spatial light modulator, a lens set and a mechanical one-dimensional scanner. The beam-splitting polarizer is configured to split an incident beam from the LED light source into two light beams of differing linear polarization. The spatial light modulator is provided for modulating an associated one of the two light beams from the beam-splitting polarizer. The lens set is provided for transforming the modulated light beam from the spatial light modulator. The mechanical one-dimensional scanner includes a pivotable reflective sheet for reflecting the transformed light beam from the lens set onto the holographic optical element in one dimension at a time, and a controller for controlling rotation of the reflective sheet about an axis step by step. And, the holographic optical element has properties of wavelength selectivity and angle selectivity and allows light to pass through.

In such a manner, when the reflective sheet is rotated about the axis at a range of angle in a brief moment of time, the holographic optical element gradually receives from the rotating reflective sheet an array of one-dimensional transformed light beams and reflects the latter to form a two-dimensional image in the eye of the wearer because of persistence of vision.

Further benefits and advantages of the present invention will become apparent after a careful reading of the detailed description with appropriate reference to the accompanying drawings.

BRIEF DESCRIPTION OF THE DRAWINGS

FIGS. 3A-3C illustrates a scanning process of a scanner (12) with respect to the holographic optical element (2) in the optical head-mounted display;

DETAILED DESCRIPTION OF THE INVENTION

Figure 1:
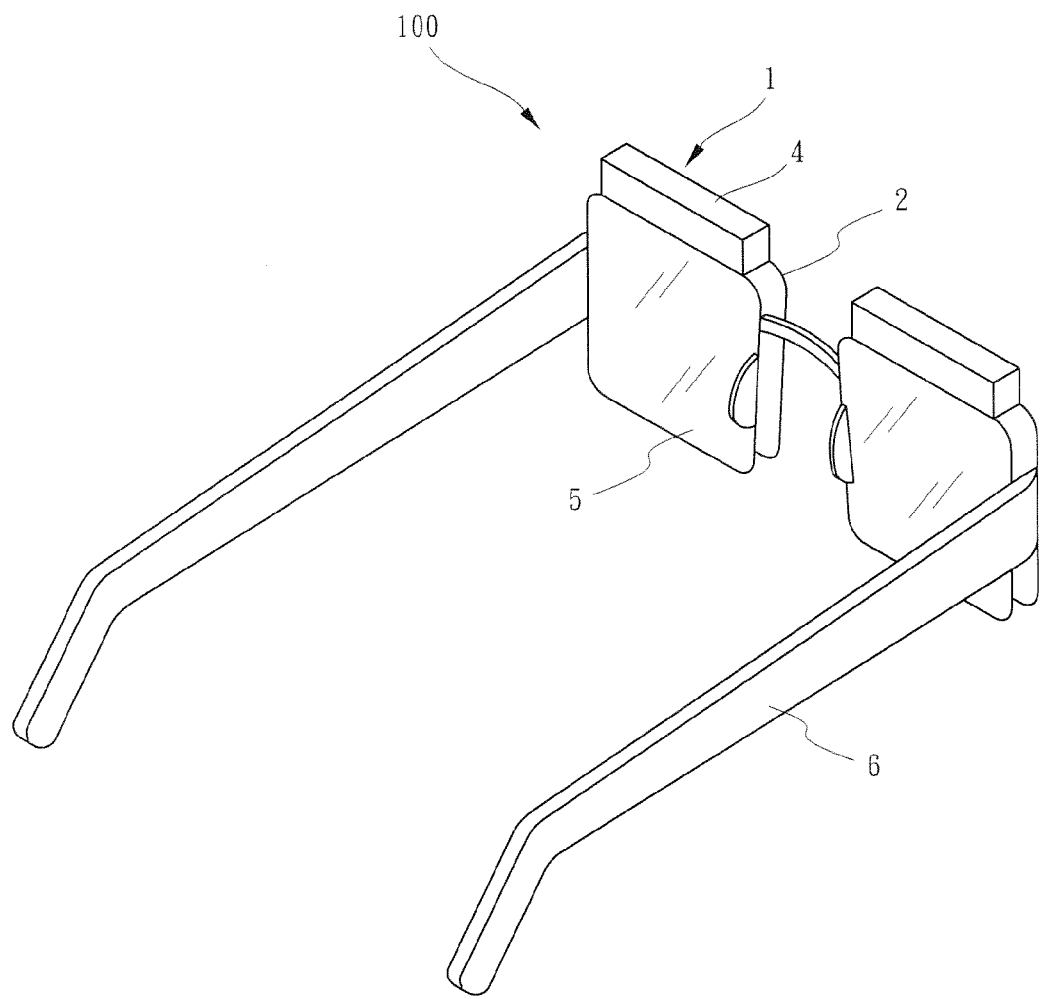
FIG. 1 is a perspective view of an optical head-mounted display according to a first embodiment of the present invention.
Figure 2:
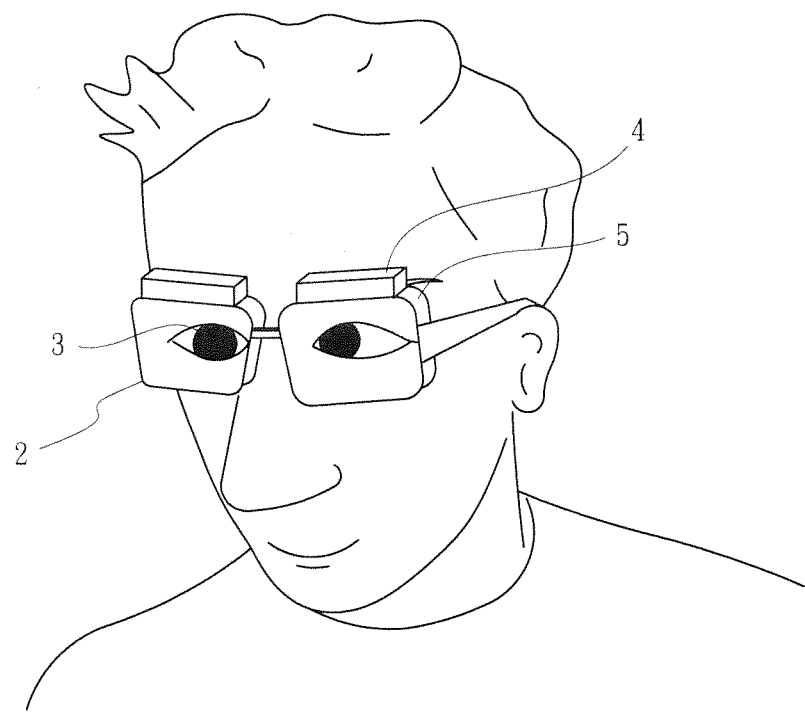
FIG. 2 illustrates the optical head-mounted display of FIG. 1 is worn by a user.

Referring to FIG. 1, there is shown an optical head-mounted display 100 constructed in accordance with a first embodiment of the present invention. The optical head-mounted display 100 generally comprises an eyeglass frame 6, a pair of eyeglass lens 5, at least one holographic optical element (HOE) 2 supported by the eyeglass frame 6 to be confronted by an eye of a wearer (see FIG. 2), and at least one projector 1 housed in a casing 4 and mounted on an upper edge of the eyeglass frame 6 to project image information on the holographic optical element 2. In particular, the holographic optical element 2 may be placed in front of the eyeglass lens 5 so that the light beams diffracted or reflected by the holographic optical element 2 will pass through the eyeglasses 5 to be mapped onto the user's pupils 3. Since the holographic optical element 2 also allows light to pass through, objects behind can be seen clearly. Thus, the optical head-mounted display 100 provides digital images from the projector 1, but also enables the wear to see the sight of the environment.

Figure 3:
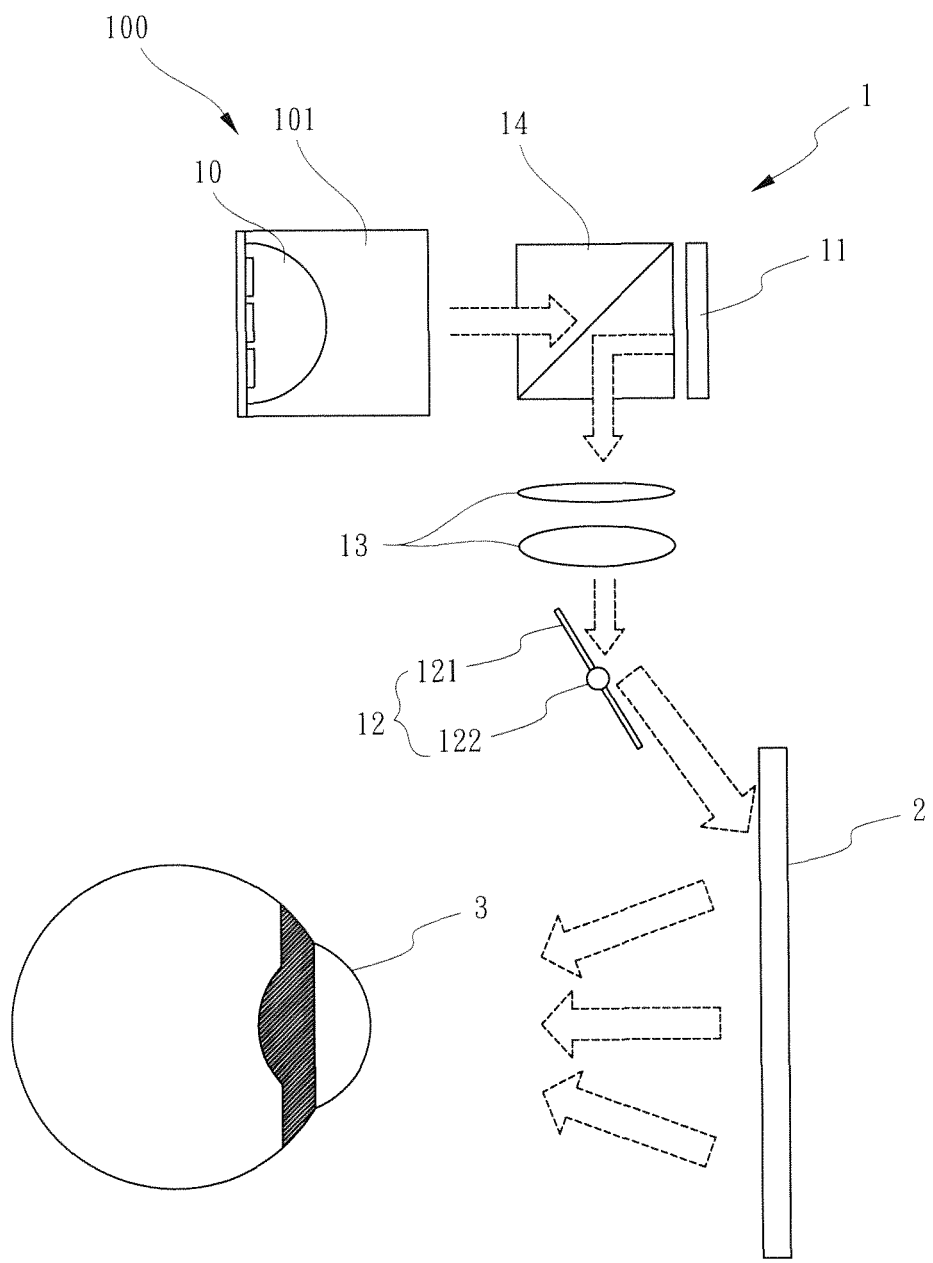
FIG. 3 is a perspective view of a projector and a holographic optical element of the optical head-mounted display.

Referring to FIG. 3, the projector 1 comprises a light source 10, a spatial light modulator (SLM) 11, a mechanical one-dimensional scanner 12, a lens set 13 and a beam-splitting polarizer 14. In this embodiment, the light source 10 is a white LED light source consisting of one blue LED, one red LED and one green LED.

In addition, the illumination mode of the light source 10 is a Lambertian light mode. The light source 10 can radiate light beams uniformly in all orientations. A light guide 101 may be provided in front of the light source 10 to direct the light beams generated by the light source 10 to the beam-splitting polarizer 14. Alternatively, the light guide 101 may be replaced by a diffuser or a combination of a light guide and a diffuser in order to completely transmit the light beams through the beam-splitting polarizer 14 to the spatial light modulator 11.

The beam-splitting polarizer 14 splits an incident beam from the LED light source into two light beams of differing linear polarization. The spatial light modulator 11 is a reflection type Spatial Light Modulator, such as Liquid Crystal on Silicon-Spatial Light Modulator (LCOS-SLM). The spatial light modulator 11 spatially modulates the phase of an associated one of the two light beams transmitted from the beam-splitting polarizer 14. The modulated light beams reflected by the spatial light modulator 11 are then further deflected by the beam-splitting polarizer 14 to go through the lens set 13. The lens set 13 transforms the modulated light beam from the spatial light modulator 11 to reach a reflective sheet 121 of the mechanical one-dimensional scanner 12. The reflective sheet 121 is pivotable about a pivot shall 122 to gradually reflect the modulated light beam to the holographic optical element 2 in one dimension at a time. A controller (not shown) is further employed by the scanner 12 for controlling rotation of the reflective sheet 121 about an axis of the pivot shaft 122 step by step.

More specifically, the reflective sheet 121 of the scanner 12 is configured to rotate with a constant angle increment and rotate within a constant angle range to receive the light beams from the lens set 13 so as to gradually reflect the received light beams to the holographic optical element 2. As shown in FIGS. 3A to 3C, when the reflective sheet 121 is rotated about the axis of the pivot shaft 122 step by step at a range of angle in a brief moment of time, the holographic optical element 2 gradually receives from the rotating reflective sheet 121 an array of one-dimensional transformed light beams 21, 22 (and so on) and reflects the latter to form a two-dimensional image in the eye due to persistence of vision.

The holographic optical element 2 is light and small, and has properties of wavelength selectivity and angle selectivity and allows light to pass through so that objects behind can be seen clearly. Thus, the holographic optical element 2 is utilized in this present invention to replace a conventional mirror which is opaque or a beam splitter in which photons with energy are partly wasted.

Moreover, the mechanical one-dimensional scanner 12 rotates to reflect the light beams in one dimension at a time within the specific incident angle range to the holographic optical element 2 so that most of the light beams can reach to the holographic optical element 2 and reduce the energy loss of light beams.

Figure 4:
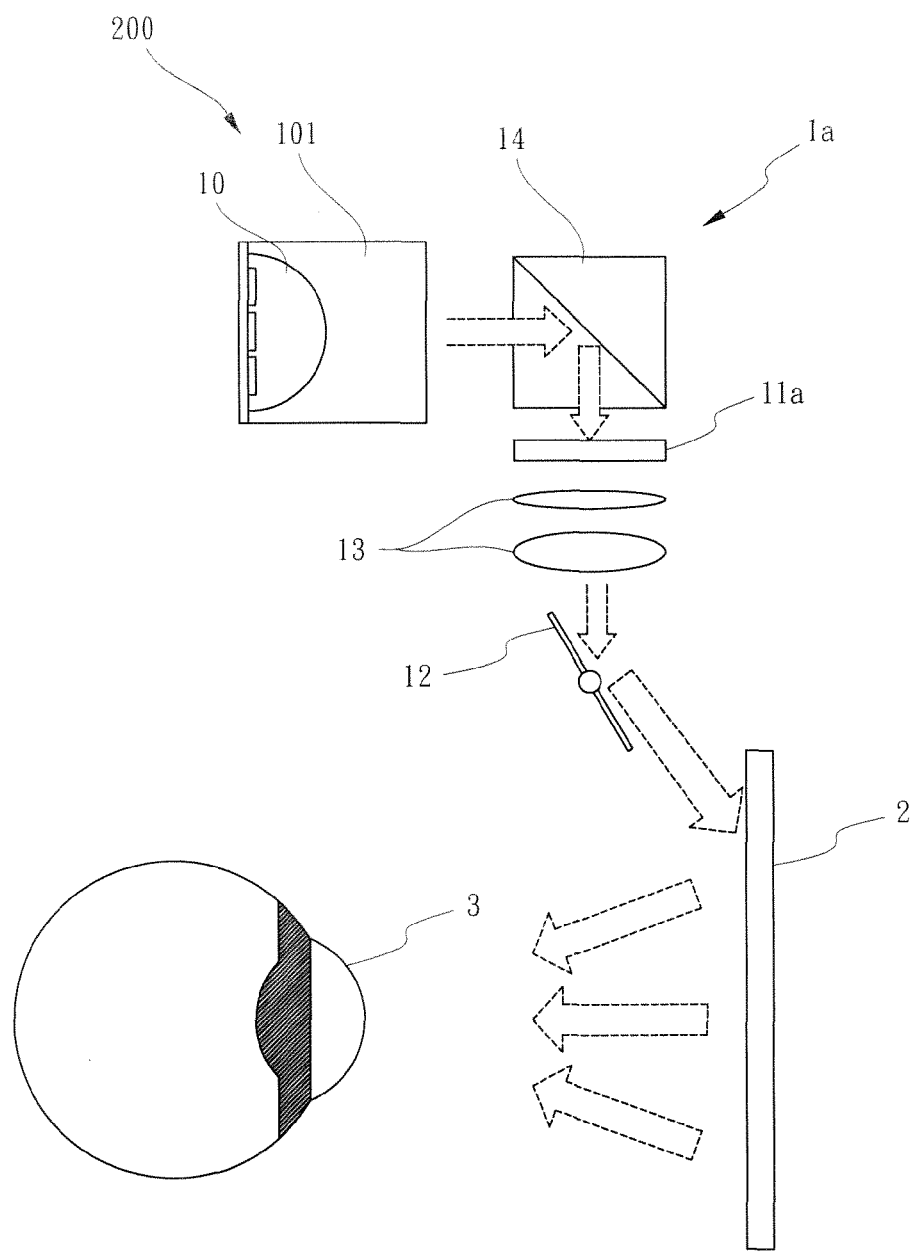
FIG. 4 is a view similar to FIG. 3, showing an optical head-mounted display according to a second embodiment of the present invention.

With reference to FIG. 4, an optical head-mounted display 200 is provided according to a second embodiment of the present invention. In this embodiment, the light source 10 emits light beams to pass through the light guide 101. The light guide 101 directs the light beams generated by the light source 10 to a transmission type spatial light modulator 11a via the beam-splitting polarizer 14. The modulated light beam by the spatial light modulator 11a is then transmitted through the lens set 13 to reach to the mechanical one-dimensional scanner 12. Once rotated, the reflective sheet 121 of the mechanical one-dimensional scanner 12 reflects the modulated light beam step by step onto the holographic optical element 2, as discussed in the first embodiment.

Figure 5:
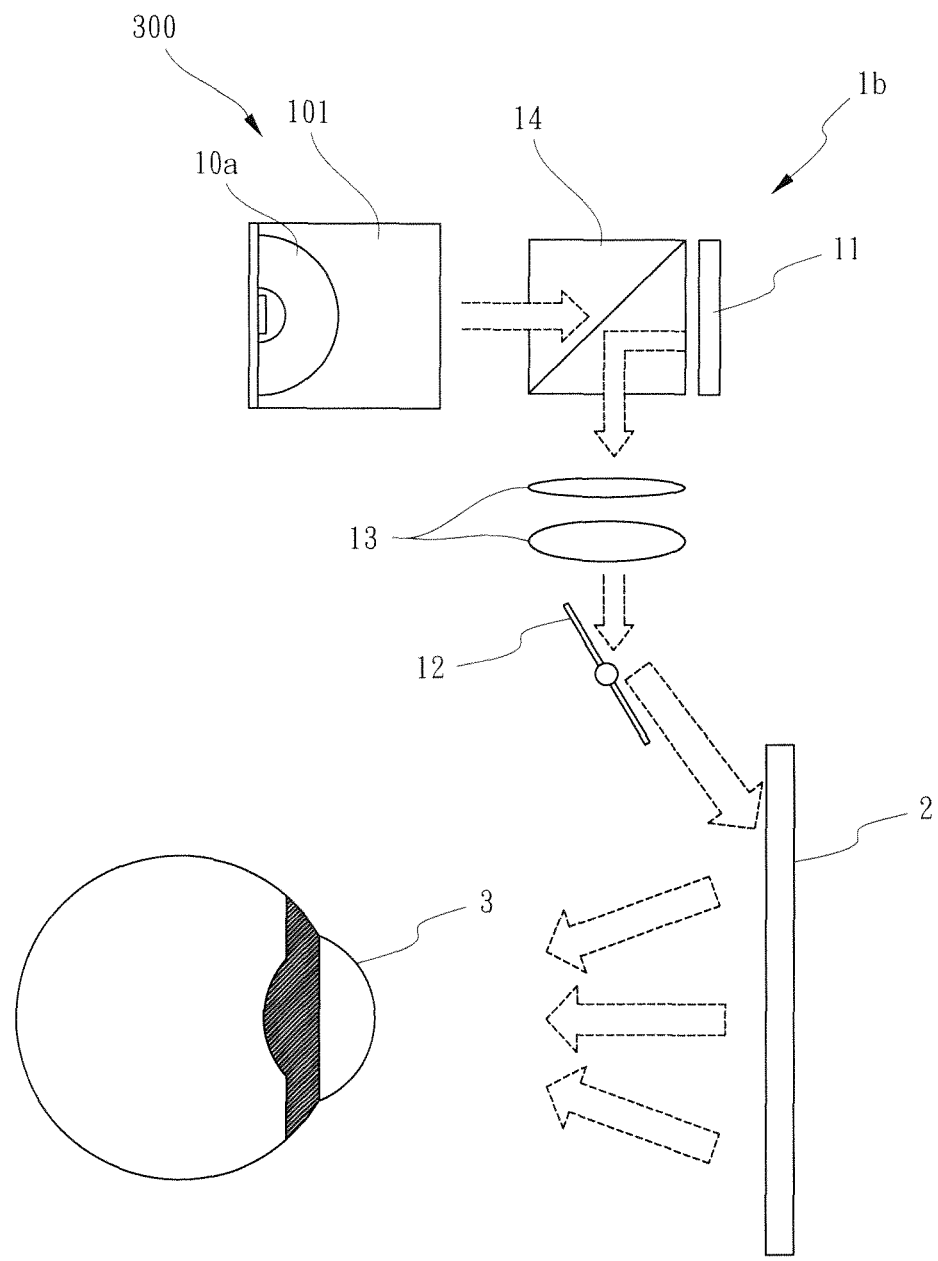
FIG. 5 is a view similar to FIG. 3, showing an optical head-mounted display according to a third embodiment of the present invention.

With reference to FIG. 5, an optical head-mounted display 300 is provided according to a third embodiment of the present invention. The display 300 in the third embodiment is substantially similar to the one in the first embodiment which is shown in FIG. 3, except that the light source 10a in the third embodiment is a phosphor-based white-light LED.

Figure 6:
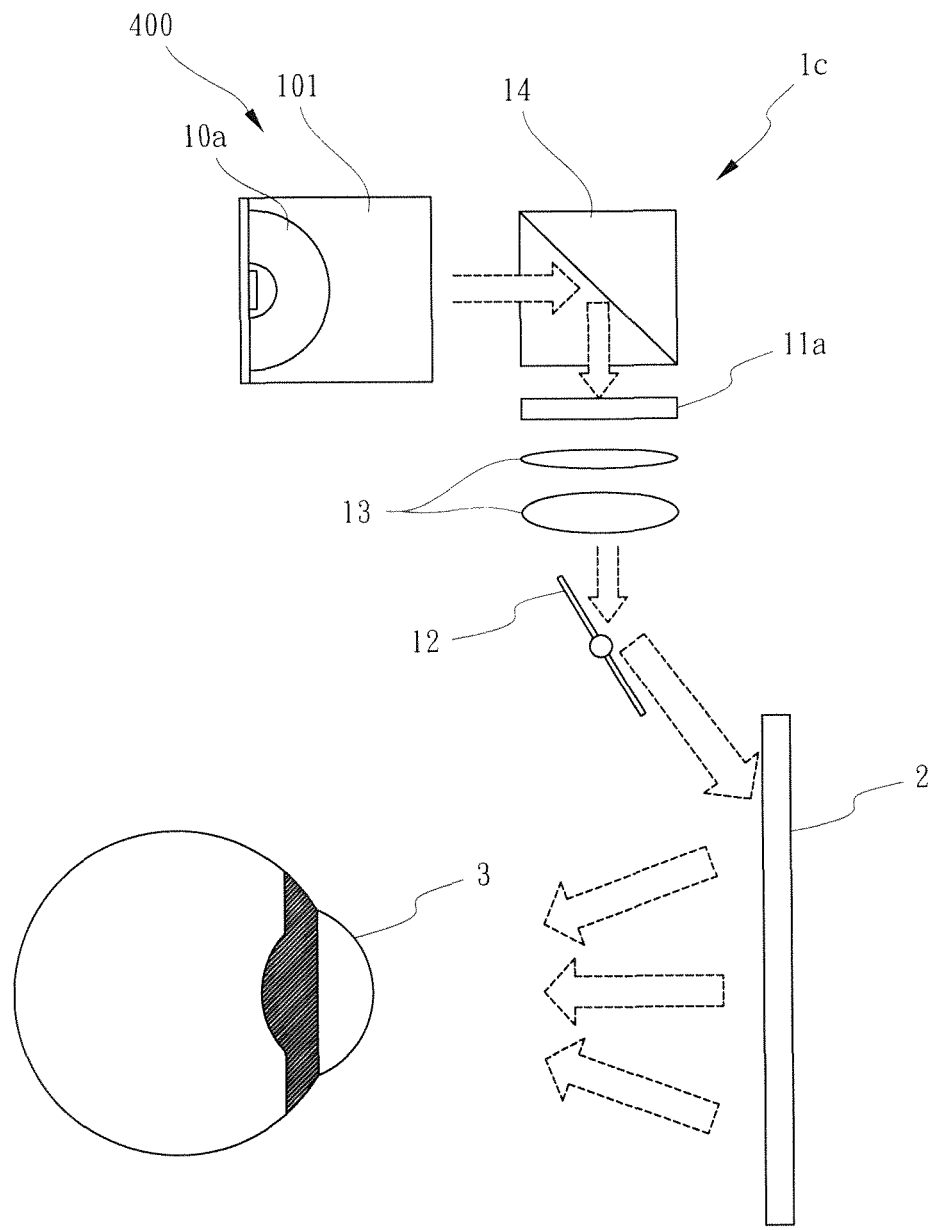
FIG. 6 is a view similar to FIG. 3, showing an optical head-mounted display according to a fourth embodiment of the present invention.

With reference to FIG. 6, an optical head-mounted display 400 is provided according to a fourth embodiment of the present invention. The display 400 in the fourth embodiment is substantially similar to the one in the second embodiment which is shown in FIG. 4, except that the light source 10a in the fourth embodiment is a phosphor-based white-light LED.

Although the invention has been explained in relation to its preferred embodiment, it is to be understood that many other possible modifications and variations can be made without departing from the spirit and scope of the invention as hereinafter claimed.

What is claimed is:

1. An optical head-mounted display comprising an eyeglass frame, a holographic optical element (HOE) supported by the eyeglass frame to be confronted by an eye of a wearer, and a projector mounted on the eyeglass frame to project image information on the holographic optical element, wherein the projector includes:
   a LED light source;
   a beam-splitting polarizer configured to split an incident beam from the LED light source into two light beams of differing linear polarization;
   a spatial light modulator for modulating an associated one of the two light beams from the beam-splitting polarizer;
   a lens set for transforming the modulated light beam from the spatial light modulator;
   a mechanical one-dimensional scanner comprising a pivotable reflective sheet for reflecting the transformed light beam from the lens set onto the holographic optical element in one dimension at a time, and a controller for controlling rotation of the reflective sheet about an axis step by step; and
   the holographic optical element having properties of wavelength selectivity and angle selectivity and allowing light to pass through;
   wherein when the reflective sheet is rotated about the axis at a range of angle in a brief moment of time, the holographic optical element gradually receives from the rotating reflective sheet an array of one-dimensional transformed light beams and reflects the latter to form a two-dimensional image in the eye of the wearer because of persistence of vision.

2. The optical head-mounted display as claimed in claim 1, wherein the light source is a white LED light source including one blue LED, one red LED and one green LED.

3. The optical head-mounted display as claimed in claim 1, wherein the light source is a phosphor-based white LED.

4. The optical head-mounted display as claimed in claim 1, further comprising a light guide interposed between the light source and the beam-splitting polarizer to direct light generated by the light source to the beam-splitting polarizer.

5. The optical head-mounted display as claimed in claim 1, further comprising a diffuser interposed between the light source and the beam-splitting polarizer to diffusing light generated by the light source.

6. The optical head-mounted display as claimed in claim 1, wherein the spatial light modulator is a Liquid Crystal on Silicon-Spatial Light Modulator (LCOS-SLM).

7. The optical head-mounted display as claimed in claim 1, wherein the projector is disposed on an upper edge of the eyeglass frame.

8. The optical head-mounted display as claimed in claim 7, further comprising at least one eyeglass lens, wherein the holographic optical element is disposed on a front side of the eyeglass lens away from the eye of the wearer.

\* \* \* \* \*